United States Patent

Tokushima et al.

[11] Patent Number: 5,834,870
[45] Date of Patent: Nov. 10, 1998

[54] OIL IMPREGNATED POROUS BEARING UNITS AND MOTORS PROVIDED WITH SAME

[75] Inventors: Hidekazu Tokushima, Matsudo; Motohiro Miyasaka, Nagareyama; Michihiro Aizawa; Hideo Shikata, both of Matsudo; Katsutoshi Nii, Hitachi, all of Japan

[73] Assignee: Hitachi, Ltd., Tokyo, Japan

[21] Appl. No.: 858,347

[22] Filed: May 19, 1997

Related U.S. Application Data

[63] Continuation of Ser. No. 426,263, Apr. 21, 1995, abandoned.

[30] Foreign Application Priority Data

Apr. 28, 1994 [JP] Japan .................................. 6-092203
Oct. 13, 1994 [JP] Japan .................................. 6-247495

[51] Int. Cl.⁶ .............................. H02K 7/08; H02K 5/16
[52] U.S. Cl. .......................... 310/90; 310/90.5; 384/107; 384/112
[58] Field of Search .................. 310/90, 90.5; 384/107, 384/112

[56] References Cited

U.S. PATENT DOCUMENTS

| | | | |
|---|---|---|---|
| 4,128,280 | 12/1978 | Purtschert | 308/9 |
| 4,254,961 | 3/1981 | Fersht et al. | 277/80 |
| 4,340,261 | 7/1982 | Wehde | 308/10 |
| 4,645,960 | 2/1987 | Hoffman | 310/90.5 |
| 4,694,213 | 9/1987 | Gowda et al. | 310/90 |
| 4,717,266 | 1/1988 | Hart, Jr. et al. | 384/100 |
| 4,726,640 | 2/1988 | Iwama et al. | 350/6.8 |
| 4,734,606 | 3/1988 | Hajec | 310/90.5 |
| 4,820,950 | 4/1989 | Hijiya et al. | 310/90.5 |
| 5,009,436 | 4/1991 | Endo et al. | 277/80 |
| 5,126,610 | 6/1992 | Fremerey | 310/90.5 |
| 5,227,686 | 7/1993 | Ogawa | 310/90 |
| 5,280,208 | 1/1994 | Komura et al. | 310/90 |
| 5,315,197 | 5/1994 | Meeks et al. | 310/90.5 |
| 5,323,076 | 6/1994 | Hajec | 310/90 |
| 5,386,166 | 1/1995 | Reiner et al. | 310/90.5 |
| 5,402,023 | 3/1995 | Nakanishi et al. | 310/90 |
| 5,448,121 | 9/1995 | Tada | 310/90.5 |
| 5,453,650 | 9/1995 | Hashimoto et al. | 310/268 |
| 5,469,008 | 11/1995 | Nakajima et al. | 310/90.5 |
| 5,471,104 | 11/1995 | Toshimitsu et al. | 310/90 |

FOREIGN PATENT DOCUMENTS

| | | | |
|---|---|---|---|
| 3213-418 | 10/1982 | Germany . | |
| 55-5530652 | of 1980 | Japan . | |
| 59-126114 | of 1984 | Japan | 310/90 |
| 59-151618 | of 1984 | Japan | 310/90 |
| 62-235253 | 9/1987 | Japan | 310/90 |
| 63-152333 | 6/1988 | Japan | 310/90 |
| 3-270739 | 10/1991 | Japan | 310/90 |

*Primary Examiner*—Steven L. Stephan
*Assistant Examiner*—Elvin G. Enad
*Attorney, Agent, or Firm*—Antonelli, Terry, Stout & Kraus, LLP

[57] ABSTRACT

An oil impregnated porous bearing unit includes an arrangement wherein an oil impregnated porous bearing containing ferro-fluid is fixed in a non-magnetizable housing, a ring shaped permanent magnet is disposed so that the ferro-fluid will exist in a gap between a rotary shaft, whereon the ring shaped permanent magnet is fixed, and the oil impregnated porous bearing, and the ferro-fluid circulates between a slide plane of the bearing and a body of the oil impregnated porous bearing with rotation of the rotary shaft by utilizing the magnetic attractive force of the permanent magnet and a capillary phenomenon in the oil impregnated porous bearing. In addition, a spiral groove may be provided in an exterior circumferential surface of the permanent magnet fixed to the rotary shaft or in an interior circumferential surface of the housing facing the above exterior circumferential surface of the permanent magnet in order to generate dynamic pressure at the spiral groove portion with rotation of the rotary shaft so as to supply ferro-fluid to the oil impregnated porous bearing.

26 Claims, 5 Drawing Sheets

OIL IMPREGNATED POROUS BEARING UNITS AND MOTORS PROVIDED WITH SAME

This application is a Continuation application of Ser. No. 08/426,263, filed Apr. 21, 1995 now abandoned.

BACKGROUND OF THE INVENTION

The present invention relates to a bearing unit using ferro-fluid for a lubricant, especially, to an oil impregnated porous bearing unit providing no contamination from leaked oil from the bearing unit and which is suitable for motors for acoustic and visual equipment which require silent, and fast and accurate rotation, polygon mirror motors for laser scanning, fan motors for air conditioners, and spindle motors for magnetic disk driving, and the like, and to manufacturing methods thereof.

As a bearing for a rotating shaft, ball bearings and plane bearings have conventionally been used, and air bearings have been used for equipment which requires high speed rotation. However, in accordance with current improvement in quality of acoustic equipment, visual equipment, laser beam printers, magnetic disk equipment, and air conditioners, fast and accurate rotation is required for motors used in this equipment. Conventionally, ball bearings are used for the motors of the above equipment, and oil impregnated porous bearings are used for plane bearings when low cost bearings are required. Further, in consideration of a balance of characteristics and cost, a combination of the ball bearing and the oil impregnated porous bearing is used.

As for the oil impregnated porous bearing, bearing mechanisms utilizing a ferro-fluid are disclosed in JP-A-55-30562 (1980), JP-A-59-126114 (1984), and JP-A-59-151618 (1984). The disclosed bearing mechanism utilizes the ferro-fluid both as a lubricant and as a sealant, and almost all of the disclosed mechanisms indicate an effectiveness of the ferro-fluid as a sealant.

In accordance with the technology disclosed in JP-A-55-30562 (1980), a bearing is fabricated by inserting a rotary shaft through ring shaped yokes, which hold a permanent magnet and oil impregnated porous materials therebetween with a small gap, and ferro-fluid is retained in the gap.

In accordance with the technology disclosed in JP-A-59-126114 (1984), a ferro-fluid was impregnated into porous bodies which formed a slide plane, and the ferro-fluid impregnated into the porous bodies was concentrated and maintained at the slide plane by a magnetic gradient generated by a magnetic circuit which was formed of permanent magnets.

In accordance with the technology disclosed in JP-A-59-151618 (1984), a magnetic repulsive force between a rotary shaft and a bearing was generated by a permanent magnet, and the bearing was composed so as to form a lubricating film of ferro-fluid at the slide plane. That is, the above described bearing mechanisms function as a lateral bearing by providing permanent magnets and retaining a ferro-fluid at the slide plane of the bearing for lubrication.

However, when a ball bearing was used for high speed rotation, it was found that problems in characteristics, such as increasing vibration with the rolling balls and acoustic noise of rolling were generated, and significant improvement in characteristics for supporting high speed rotation could not be expected. Further, in order to maintain accurate rotation, it was required to improve the accuracy in manufacturing the composing members, such as the balls, the inner race, the outer race and so on, and accordingly manufacturing cost was high.

On the contrary, oil impregnated porous bearings were inexpensive in cost, and accurate quality bearings were available. However, the oil impregnated porous bearing had problems, such as a large consuming electric power and others, because the bearing generally used mixed lubricants which caused a larger friction coefficient than that of a fluid lubricating condition. Further, the bearing had a large difference in friction between static friction and dynamic friction, and especially, the bearing had a problem in that it would take a long time to obtain a stable routine rotation at the time of starting up. Furthermore, the oil impregnated porous bearing could not be used for motors of acoustic and imaging equipment, such as a cylinder motor for a video tape recorder, since sufficient lubrication could not be expected in a case of plane-plane sliding such as provided by a thrust bearing, because exudation of the impregnated oil, which is an typical feature of the oil impregnated porous bearing, was small in such case, and sometimes an excessively large starting torque was required.

All of the above described bearings which used ferro-fluid retained the ferro-fluid by utilizing a magnetic circuit generated by permanent magnets. However, in the former two publications, lubrication was performed by an arrangement of the permanent magnets at the static sides, and in the latter, the ferro-fluid was retained by an arrangement of the permanent magnets at both the static side and the rotating side so as to face the permanent magnets mutually. In any event, all of the above described bearing mechanisms are composed so as to bear the loads in a radial direction and in a thrust direction separately, and not to bear the loads in both the radial direction and the thrust direction using only a bearing.

In addition to the above bearings using permanent magnets, a bearing unit wherein a seal is provided at each of both ends of the bearing, respectively, and the in which a ferro-fluid is retained at the slide plane, has been known. However, if the ferro-fluid is sealed, a volume of the ferro-fluid expands in accordance with increase in temperature of the bearing by high speed rotation, and a problem to spread the ferro-fluid out from the seal portion is caused. Therefore, a double seal mechanism is required for ensuring the seal of the ferro-fluid which is enclosed in the bearing unit. Accordingly, this known bearing unit is complex, and the above requirement makes any possibility of reducing the bearing unit in size and in thickness difficult. Further, the requirement necessitates an accurate manufacturing facility for enclosing the ferro-fluid into the bearing adequately. As explained above, with the conventional bearing, barriers in performance, reliability, and cost have prohibited development of high speed and highly accurate rotation motors.

SUMMARY OF THE INVENTION (1) Objects of the Invention:

In consideration of the above described problems, a first object of the present invention is to provide a bearing unit which can bear both loads in a radial direction and in a thrust direction using only one bearing, which can avoid inconvenience of the bearing caused by temperature raise, which can certainly seal the ferro-fluid, and which is responsive to a high speed and highly accurate rotation demand and is inexpensive in cost.

A second object of the present invention is to provide motors provided with the bearing which is responsive to a high speed and highly accurate rotation demand and is inexpensive in cost.

A third object of the present invention is to provide a method for manufacturing the above bearing unit simply.

(2) Methods for Solving the Problems:

In order to realize the above described first object of the present invention, a first aspect of the invention is characterized in provision of an oil impregnated porous bearing unit, wherein a rotary shaft is supported rotatably by a bearing retaining ferro-fluid between the rotary shaft and the bearing, comprising a ring shaped permanent magnet fixed to the rotary shaft, the oil impregnated porous bearing containing the ferro-fluid being fixed to locations adjacent to the above permanent magnet inside the housing of the bearing, and the ferro-fluid being impregnated into the porous bearing, the arrangement being such that the ferro-fluid is exuded into a gap between the permanent magnet and an end face of the porous bearing facing the permanent magnet and into a gap between the exterior circumferential plane of the rotary shaft and the interior circumferential plane of the porous bearing, and the ferro-fluid circulates between the slide plane and the oil impregnated porous bearing in accordance with rotation of the rotary shaft.

In the above described case, the permanent magnet can be arranged between a pair of the oil impregnated bearings, or an oil impregnated bearing can be arranged between a pair of permanent magnets. The rotary shaft can be made of permeable material and the oil impregnated porous bearing can be made of non-magnetizable material, and the reverse of the above combination is also usable.

Further, a concave portion and a convex portion can be formed on either of the facing planes of the oil impregnated porous bearing or the permanent magnet in order to obtain a wedge effect. Further, in consideration of friction in the thrust direction, a thin ring having a low friction coefficient and a superior wear resistance can be provided on the rotary shaft between a gap between the end face of the permanent magnet and the end face of the oil impregnated porous bearing facing to the permanent magnet. Additional permanent magnets for catching and retaining the ferro-fluid can be provided at both end portions of the housing of the oil impregnated porous bearing unit. Washers can be provided at a further outer side of the additional permanent magnet. In consideration of the assembling operation, the housing can be formed in two parts, with one part having one of the oil impregnated porous bearings and another part having the other oil impregnated porous bearing. Each of the above described two parts of the housing has a connecting portion respectively at facing end faces in order to join the two parts together at the assembling operation.

Further, in accordance with the present invention, an oil impregnated porous bearing unit, wherein an oil impregnated porous bearing is fitted to a housing made of non-magnetizable materials and a rotary shaft is supported rotatably by the bearing retaining ferro-fluid between the rotary shaft and the bearing, is composed so that a ring shaped permanent magnet fixed to the rotary shaft made of permeable material is arranged at or near an open end of the housing, the ring shaped permanent magnet and the oil impregnated porous bearing containing the ferro-fluid are arranged at adjacent locations with a gap, a spiral groove for generating dynamic pressure is provided at the interior circumferential plane of the housing facing the exterior circumferential plane of the permanent magnet or the exterior circumferential plane of the ring shaped permanent magnet so as to supply the ferro-fluid to the oil impregnated porous bearing by rotating the rotary shaft utilizing the ring shaped permanent magnet fixed to the rotary shaft made of permeable material and the spiral groove for generating dynamic pressure, and concurrently to prevent leakage of the ferro-fluid from the bearing unit. Furthermore, an oil impregnated porous bearing unit, wherein an oil impregnated porous bearing is fitted to a housing made of non-magnetizable material having open ends and a rotary shaft is supported rotatably by the bearing retaining ferro-fluid between the rotary shaft and the bearing, is composed so that a ring shaped permanent magnet fixed to the rotary shaft made of permeable material is arranged at or near one of the open ends of the housing, a ring shaped porous plate having larger size pores than pores in the oil impregnated porous bearing containing the ferro-fluid is arranged at another open end of the housing in tight contact with the oil impregnated porous bearing, a spiral groove for generating dynamic pressure is provided at the interior circumferential plane of the housing facing the exterior circumferential plane of the permanent magnet or the exterior circumferential plane of the ring shaped permanent magnet so as to supply the ferro-fluid to the oil impregnated porous bearing by rotating the rotary shaft utilizing the ring shaped permanent magnet fixed to the rotary shaft made of permeable material, the spiral groove for generating dynamic pressure, and the ring shaped porous plate, and concurrently to prevent leakage of the ferro-fluid from the bearing unit.

Problems in mass productivity and production cost were resolved by selecting an oil impregnated porous bearing suitable for mass production and simplifying the structure of the bearing.

In order to realize the second object of the present invention, a second aspect of the invention utilizes the above described oil impregnated porous bearing unit as a bearing for supporting a rotary shaft which rotates with a rotor of a motor.

In order to achieve the third object of the present invention, a third aspect of the invention involves a method which comprises the steps of press fitting an oil impregnated porous bearing containing ferro-fluid at respective positions inside of a pair of housings having insides which are previously manufactured accurately to a designated diameter, inserting a rotary shaft on which a permanent magnet is fixed at an exterior circumferential plane into a lubricating plane inside of the oil impregnated porous bearing in the one of the housings, inserting a lubricating plane inside of the oil impregnated porous bearing in the other one of the housings at an exterior circumferential plane of the rotary shaft, and joining the housings at facing end faces of connecting portions by contacting and using connecting means, such as an adhesive agent, brazing, friction pressure welding, and so on.

In the above described case, the size and shape of the lubricating plane in a radial direction of the oil impregnated porous bearing are preferably formed by press fitting of sizing pins with a view toward achieving accuracy and efficiency.

In accordance with the first aspect, the ferro-fluid magnetized by the permanent magnet is captured at a thrust pad portion, because the ring shaped permanent magnet is fixed at the rotary shaft and an oil impregnated porous bearing containing ferro-fluid is used. Especially, in the case when the rotary shaft is made of a permeable material, the rotary shaft is magnetized by the ring shaped permanent magnet, and the ferro-fluid is absorbed onto the surface of the rotary shaft and a metal-metal contact can be prevented even if start-stop motions are repeated. Further, at the radial bearing portion, the ferro-fluid contained in the bearing exudes by a natural pumping effect of the oil impregnated porous bearing and self heating of the bearing induced with rotation of the rotary shaft, and both thrust and radial bearing portions are filled with the ferro-fluid. Therefore, both loads in the thrust direction and in the radial direction can be borne by only one bearing, and fluid lubrication becomes available at the slide planes in both directions.

When the ring shaped permanent magnet is fixed at the rotary shaft and an oil impregnated porous bearing containing ferro-fluid is arranged, respectively, at each of both ends of the rotary shaft, the ferro-fluid which is magnetized at the thrust pad portion is extruded towards the exterior circumference by a centrifugal force generated by rotating the rotary shaft, and the extruded ferro-fluid is absorbed into the porous oil impregnated bearing. The oil impregnated porous bearing supplies the contained ferro-fluid to the slide planes by the naturally pumping effect of the oil impregnated porous bearing and self heating of the bearing induced with rotation of the rotary shaft, as previously described, but concurrently absorbs the ferro-fluid. Therefore, the ferro-fluid circulates though the radial bearing portion and the thrust bearing portion in the bearing unit by the supplying and absorbing effect at the slide plane.

Therefore, the ferro-fluid is captured and repeatedly circulates at the middle portion of the rotary shaft, and in accordance with the above described present invention, a bearing unit superior in sealing property, which does not cause any splash or leakage of the ferro-fluid to outside the bearing unit, can be obtained. Further, in accordance with the above composition, both loads in the radial direction and in the thrust direction can be borne simultaneously by only one bearing, and additionally, a motor using the bearing can be placed in either of vertical and horizontal positions because the thrust pad portion can bear the load in axial directions for both positions. In the above case, the bearing relating to the present invention does not require any special seal for preventing leakage of the ferro-fluid, and accordingly, any failure in lubrication does not occur. However, if the bearing is used for a high speed motor, such as a motor which operates at more than thousands of rotations per minute, ring shaped permanent magnets are provided at both end portions of the bearing housing, respectively, in order to make the sealing more confident by capturing the ferro-fluid in the interval between the permanent magnets even if the ferro-fluid exudes outside due to centrifugal force.

Furthermore, the bearing unit as above described can have various features providing mutually different operational effects by selecting a combination of materials of the oil impregnated porous bearing and the rotary shaft because the permanent magnet is arranged at the rotary shaft. That is, in a combination consisting of a permeable sintered bearing (iron group sintered bearings) as the oil impregnated porous bearing and a non-magnetizable rotary shaft, anti-thrust load performance can be improved because the bearing is magnetized by the permanent magnet and a larger amount of the ferro-fluid is captured at the thrust bearing portion than the radial bearing portion. Conversely, in a combination consisting of a permeable rotary shaft and a non-magnetizable oil impregnated porous bearing (for instance, copper group sintered bearings), anti-radial load performance can be improved because the rotary shaft is magnetized by the permanent magnet and a larger amount of the ferro-fluid is captured at the radial bearing portion than the thrust bearing portion.

Further, generating dynamic pressure is enhanced by forming a concave portion and a convex portion at both slide planes of the radial and thrust bearings because of a wedge effect of the oil film. Accordingly, lateral vibration of the rotary shaft can be reduced to a small value, and a motor having a preferably accurate rotation can be attained. When a washer is provided between the ring shaped permanent magnet and the oil impregnated porous bearing in the thrust bearing portion, not only can the friction coefficient at the thrust bearing portion be reduced to a small value, but also wear resistance can be improved. Therefore, a washer having a smaller friction coefficient than generally used permanent magnets and a preferable wear resistance can be provided at each of both ends of the permanent magnet for reducing friction and wear at the thrust slide plane.

Further, in the oil impregnated porous bearing relating to the present invention, the ferro-fluid is certainly drawn onto the surface of the rotary shaft because the permeable rotary shaft is magnetized by the permanent magnet. Accordingly, the slide plane between the shaft and the bearing is always wet with the ferro-fluid, and leakage of the ferro-fluid in a static condition or a low speed rotating condition, wherein a dynamic pressure effect can not be expected, can be prevented by a force of the permanent magnet.

The ferro-fluid contained in the oil impregnated porous bearing exudes from the bearing by volumetric expansion caused by self heating of the bearing with rotation of the shaft, and the exuded ferro-fluid is attracted by the permanent magnet. Then, the attracted ferro-fluid is transferred to the oil impregnated porous bearing by the effect of the above described spiral groove for generating dynamic pressure. The transferred ferro-fluid is absorbed into the oil impregnated porous bearing by capillary action. The spiral groove acts as a seal because the dynamic pressure generated by the spiral groove prevents leakage of the ferro-fluid from the housing concurrently with supplying the ferro-fluid to the bearing portion. Further, in accordance with the composition of the bearing unit relating to the present invention, the bearing and the ring shaped permanent magnet are arranged with a gap therebetween, and the gap ensures the sealing because the ferro-fluid which can not be absorbed by the above explained pumping action of the oil impregnated porous bearing is retained in a space formed by the bearing and the ring shaped permanent magnet. Therefore, the bearing unit relating to the present invention makes it possible to lubricate and seal the bearing with a simple structure and an ensured oil self-circulating action due to a combination of the permanent magnet, the spiral groove for generating dynamic pressure, and the oil impregnated porous bearing.

Furthermore, in accordance with the composition of the bearing unit relating to the present invention, sufficient fluid lubrication can be ensured even in a high speed rotating condition, because a spiral groove for generating dynamic pressure is provided at an exterior circumferential plane of the rotary shaft, or interior circumferential plane of the housing which faces the exterior circumferential plane of the rotary shaft, and sealing performance of the spiral groove for the ferro-fluid increases in accordance with increasing rotary speed by the above explained action. In addition to the above combination of the permanent magnet and the spiral groove, the lubrication and sealing mechanism of the bearing by oil self-circulation, which is one of the features of the present invention, can be achieved by positioning a porous ring shaped plate containing pores having a larger diameter than that of the oil impregnated porous bearing in tight contact with the oil impregnated porous bearing. According to the above composition, the ferro-fluid which is contained in the oil impregnated porous bearing exudes from the slide plane of the bearing due to heating of the bearing with rotation of the rotary shaft, and the exuded ferro-fluid is absorbed into the porous ring shaped plate. Subsequently, the oil absorbed into the porous ring shaped plate is absorbed further into the oil impregnated porous bearing. The above described transfer utilizes a phenomenon in which, when two materials having mutually different pore sizes are in tight contact and oil is impregnated into the material having a larger pore size, the oil is transferred from the material having a larger pore size to the material having a smaller pore size by capillary action, but, if oil is impregnated into the material having the smaller pore size, the oil is not transferred to the other material. In accordance with the present composition, wherein the oil impregnated porous bearing having a smaller pore size is disposed in contact with porous material having a larger pore size, oil self-circulation to the bearing and sealing are concurrently performed.

In accordance with the bearing relating to the present invention, accurate rotation can be achieved because the slide plane is always wet with the ferro-fluid and fluid lubrication is maintained by the above operational effect, differing from oil impregnated porous bearings in the prior art. Further, regarding the sealing of the ferro-fluid, the bearing can be used in a high speed rotating condition because the bearing can prevent leakage and splash of the ferro-fluid in a wide range from a low speed rotary condition to a high speed rotary condition by the magnetic action of the permanent magnet and the dynamic pressure sealing action of the spiral groove.

In accordance with the second aspect, characteristics, such as small noise, high speed rotation, and low vibration, which are required for rotary shaft bearings of motors, such as cylindrical motors used in acoustic and/or imaging equipment, fan motors used in rotating fans for air conditioning and equipment cooling, spindle motors used in rotating magnetic medium in magnetic disk driving equipment, and polygon mirror motors used in rotating polygon mirror for scanning laser beam in light writing operation in imaging equipment, are certainly realized because a preferable rotary accuracy having superior lubrication, cooling ability, and remarkably small vibration becomes available for the above explained reasons relating to the first aspect.

In accordance with the third aspect, the oil impregnated porous bearings formed in a designated shape are press-inserted into respective bearing housings with sizing pins in order to obtain an accurate arrangement first, and assembling the inner diameter of the bearing with a circularity and sizes in a micron order of accuracy. Subsequently, a bearing unit is assembled by fitting or contacting two bearing housings at respective ends of the rotary shaft on which is fixed the permanent magnets. Accordingly, a designated gap at the thrust pad can be easily set from the size of the bearing housing. Further, since a pore distribution at the interior circumferential plane of the bearing portion can be adjusted when the bearing is press-inserted, accurate sizes can be obtained and an amount of impregnated ferro-fluid can be adjusted at the same time, and bearing units adequate for use in such conditions as high speed rotation and/or heavy load can be manufactured with low cost.

DETAILED DESCRIPTION OF THE EMBODIMENTS

Referring to drawings, embodiments of the present invention are explained hereinafter.

Embodiment 1

Figure 1:
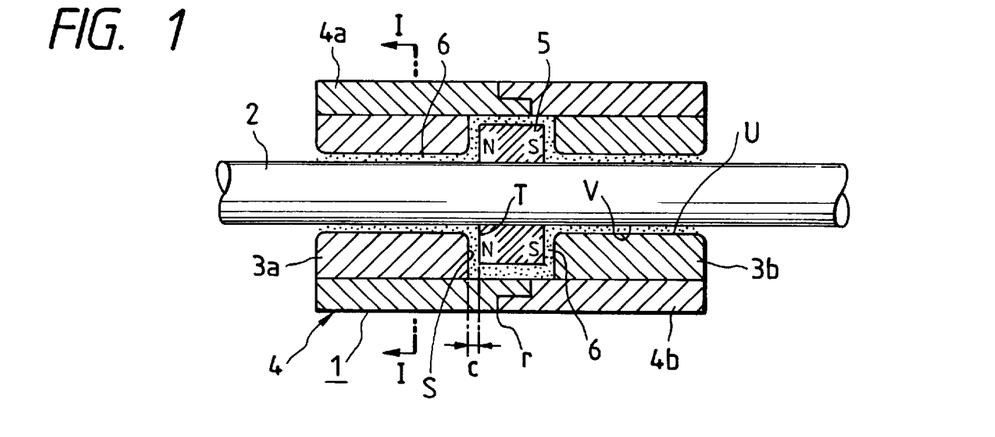
FIG. 1 is a cross-sectional view indicating the structure of the bearing unit relating to the first embodiment of the present invention.

FIG. 1 is a cross-section indicating the structure of a bearing unit relating to the first embodiment of the present invention.

In FIG. 1, the bearing unit 1 comprises two oil impregnated porous bearing 3a, 3b which are provided respectively at an inner plane of the bearing housings 4a, 4b and contain a ferro-fluid, and a rotary shaft 2 which is supported by the oil impregnated porous bearings 3a, 3b rotatably and is provided with a permanent magnet 5 fixed at exterior circumferential plane of the shaft. The oil impregnated porous bearings 3a, 3b are arranged at both ends of the bearing housings 4a, 4b respectively so that the permanent magnet 5 is disposed therebetween. In accordance with the above arrangement, a thrust bearing is composed of an end face S of the respective oil impregnated porous bearings 3a, 3b facing the permanent magnet 5 and an end face T of the permanent magnet 5, and a radial bearing is composed of interior circumferential planes U of both oil impregnated porous bearings 3a, 3b and an exterior circumferential plane V of the rotary shaft 2. The end face S and the interior circumferential plane U of the oil impregnated porous bearings 3a, 3b are wet with ferro-fluid 6.

Figure 3:
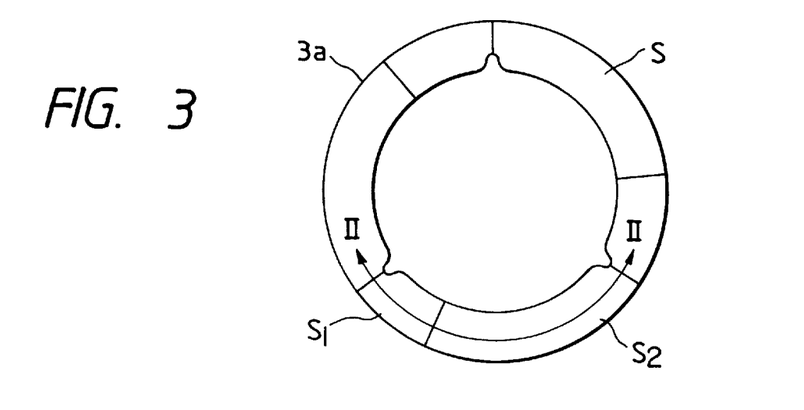
FIG. 3 is a schematic plan view of the thrust pad of the oil impregnated bearing in the first embodiment.
Figure 4:
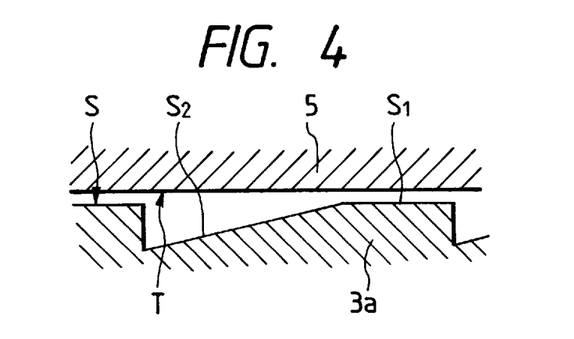
FIG. 4 is a section taken on line II—II in the thrust pad of the oil impregnated bearing in FIG. 3.

Each of the oil impregnated porous bearings 3a, 3b has three convex portions $S_1$ and three concave portions $S_2$ formed along the circumference at end face S, as shown in FIG. 3. FIG. 4 is a section taken on line II—II in FIG. 3 indicating the convex portions $S_1$ and the concave portions $S_2$. The oil impregnated porous bearings 3a, 3b are press-inserted and fixed tightly in the bearing housing 4a, 4b. The shape and size of the interior circumferential plane U of the oil impregnated porous bearings 3a, 3b are finished with sizing pins. Details of the manufacturing method will be explained later.

The bearing housings 4a, 4b have respectively a connecting portion r, which is indicated as a step in FIG. 1 for example, and one bearing housing 4 is assembled by butt joining at the connecting portions. Accordingly, the gap c between the end face S of the bearing and the end face T of the permanent magnet 5 can be set according to the length of the bearing housings 4a, 4b. Further, the bearing does not require any mechanical work, and is suitable for mass production. Consequently, manufacturing cost of the bearing including the assembling cost can be decreased so as to be inexpensive.

Figure 2:
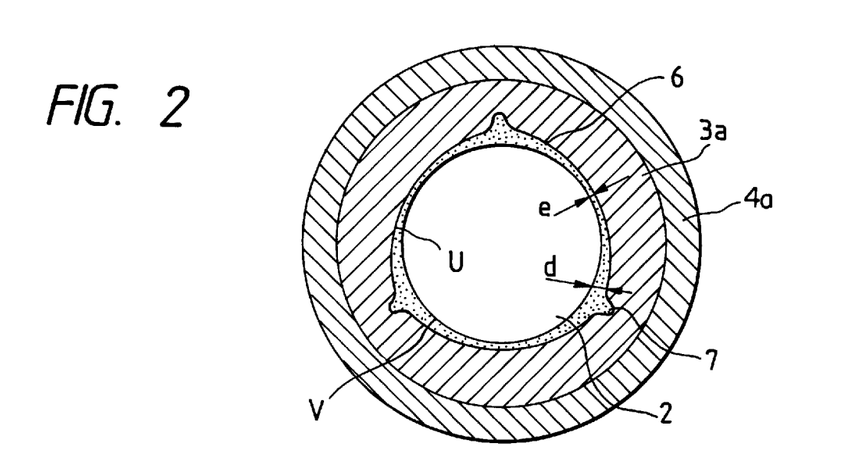
FIG. 2 is a section taken on line I—I in FIG. 1.

The load bearing ability of the bearings 3a, 3b is increased by providing the convex portions and the concave portions at slide plane U (interior circumferential plane) in a radial direction of the above described oil impregnated porous bearings 3a, 3b. That is, oil grooves 7 are provided at a radial bearing plane, as shown in FIG. 2, which indicates a section taken on line I—I in FIG. 1, and wedge shaped three lobe bearings in a circumferential direction are formed setting a gap d at an entrance portion of the oil groove 7 wider than the minimum gap e between the oil grooves, so as to increase the load bearing ability during rotation.

The thrust slide plane (the end face S) forms a taper land bearing by being provided with the concave portions $S_2$ and the convex portions $S_1$. That means, the slide plane forms a wedge shape from the concave portions $S_2$ to the convex portions $S_1$ as shown in FIG. 4, and the convex portions $S_1$ form a parallel slide plane. The shape of the concave portions $S_2$ and the convex portions $S_1$ can be other than the above described taper land bearing. For instance, a step bearing wherein the concave portions $S_2$ are formed in a parallel bottom shape with respect to the convex portions $S_1$ is possible.

In accordance with the composition described above, the ferro-fluid 6 is captured at the slide plane of the bearing by the permanent magnet 5 fixed to the rotary shaft 2, the ferro-fluid 6 captured at the slide plane is extruded toward the exterior circumferential plane of the permanent magnet 5 by a centrifugal force caused by rotation of the rotary shaft 2, as shown in FIG. 1, and the extruded ferro-fluid 6 is absorbed by the oil impregnated porous bearings 3a, 3b. By repeating the above transfer of the ferro-fluid 6, a cooling effect is realized because the ferro-fluid 6 circulates in the bearing housing 4 and the portion of the ferro-fluid 6 whose temperature is increased by heat generated at the slide plane releases the heat in the bearing housing 4, and thermal stability of the ferro-fluid 6 is ensured by the cooling effect.

Generally, an allowable temperature of the ferro-fluid 6 is deemed to be a maximum of 100° C., and accordingly, cooling of the rotary shaft must be considered in view of the temperature restriction, especially in a high speed rotating condition. In accordance with the present embodiment, wherein a function to make the ferro-fluid 6 circulate from the slide plane to the oil impregnated porous bearings 3a, 3b is provided in the bearing unit, cooling of the ferro-fluid 6 can be increased. Regarding the load bearing ability of the bearing, the rotary shaft 2 can be supported accurately with fluid lubrication because the concave portions $S_2$ and the convex portions $S_1$ for generating dynamic pressure are provided at the slide plane. Especially, acoustic noise of rotation is small in a high speed rotating condition because smooth rotation with fluid lubrication can be achieved, and when the bearing is applied to a motor, the motor is advantageously silent. Further, as the ferro-fluid 6 is captured with certainty at the slide plane of the bearing, an arbitrary combination of the rotary shaft and the bearing material can be selected. Thus with a combination of the rotary shaft 2 made of permeable material and the oil impregnated porous bearing 3a, 3b made of non-magnetizable material, the rotary shaft 2 is magnetized by the permanent magnet 5, the radial bearing portion can be wet with the ferro-fluid 6 even at a stationary condition, and accordingly, the load bearing ability in a radial direction can be increased. Conversely, in accordance with a combination of the rotary shaft 2 made of non-magnetizable material and the oil impregnated porous bearing 3a, 3b made of permeable material, magnetic flux is concentrated to the thrust slide plane, and accordingly, the bearing unit is suitable for use in a heavy thrust load condition, and a motor having preferable start up characteristics can be obtained.

Embodiment 2

Figure 5:
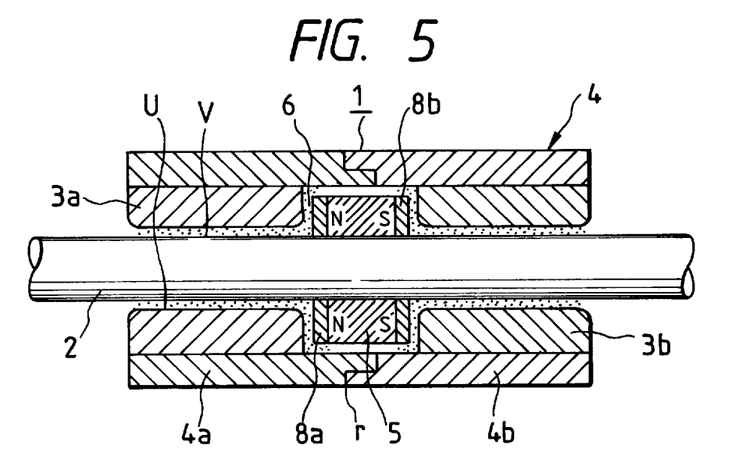
FIG. 5 is a cross-sectional view indicating the structure of the bearing unit relating to the second embodiment of the present invention.

FIG. 5 is a cross-sectional view indicating the structure of a bearing unit relating to a second embodiment of the present invention.

The present embodiment differs from the previous first embodiment in an arrangement of ring shaped washers 8a, 8b at respective end faces of the permanent magnet 5 and other portions are composed in the same manner as the first embodiment. In the present embodiment, the washers are provided for reducing friction when a thrust load is applied. Therefore, the washers are preferably made of slide material having a smaller friction coefficient than the permanent magnet 5 and a preferable wear resistance. The bearing unit relating to the present embodiment uses the ferro-fluid 6 for lubrication and the ferro-fluid 6 is absorbed at the slide plane; and accordingly, the friction coefficient at the slide plane is substantially reduced without causing a shortage of oil even if the washers 8a, 8b made of low friction material or a preferable wear resistant material are not provided. Although the wear resistance is improved, mixed lubrication happens at a starting time when the thrust load is heavy. Therefore, in order to reduce friction and wear at the starting time, the washers 8a, 8b are provided. As materials for the washers 8a, 8b, metals such as phosphor bronze or stainless steel, and resins such as nylon, polyacetal, teflon reinforced resin, and the like are preferable. When absorbing vibration in an axial direction is required, concurrent use of cushioning materials, such as rubber, can improve vibration resistance in addition to the friction resistance and wear resistance. Other portions which are not explained especially are composed in the same manner as the first embodiment.

Embodiment 3

Figure 6:
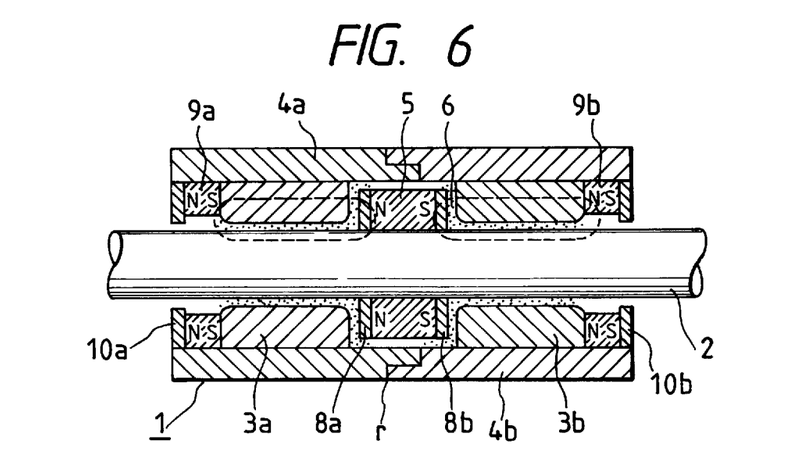
FIG. 6 is a cross-sectional view indicating the structure of the bearing unit relating to the third embodiment of the present invention.

FIG. 6 is a cross-sectional view indicating the structure of a bearing unit relating to a third embodiment of the present invention.

The present embodiment discloses a structure having tighter sealing characteristics than the bearing unit in the second embodiment shown in FIG. 5. The present embodiment differs from the previous second embodiment in arranging ring shaped permanent magnets 9a, 9b for sealing to retain and seal the ferro-fluid 6 at end portions of the bearing housings 4a, 4b opposite to the location of the permanent magnet 5, and holding plates 10a, 10b outside the ring shaped permanent magnet 9a, 9b. In accordance with the above composition, a magnetic circuit shown by dotted line in FIG. 6 is generated by a combination of the permanent magnets 5, 9a, 9b, and the rotary shaft 2 made of permeable material in order to prevent leakage and splash of the ferro-fluid 6 to the outside of the bearing housing 4a, 4b by concurrently capturing the ferro-fluid 6 at the bearing slide plane and by the permanent magnets 9a, 9b arranged at the end portions of the bearing housings 4a, 4b.

That is, the ferro-fluid contained in the oil impregnated porous bearing 3a, 3b expands in volume and exudes to the outside of the bearing by heat generated at the bearing and the motor. However, when the bearing is used in a high speed rotating condition, such as thousands of rotations per minute, the ferro-fluid can not be absorbed completely into the oil impregnated porous bearings 3a, 3b only by the pumping action accompanied with rotation of the rotary shaft 2, and there may be a possibility of overflow to the end portions of the bearings. If the ferro-fluid 6 overflows to the end portions of the bearings, the overflowing ferro-fluid 6 splashes due to centrifugal force. However, when the ring shaped permanent magnets 9a, 9b, and the holding plates 10a, 10b are arranged at the end portions of the bearing housings 4a, 4b, the ferro-fluid 6 is captured in the above described magnetic circuit, and sealing is ensured. Other portions not explained especially are composed in the same manner as the second embodiment.

Embodiment 4

Figure 7:
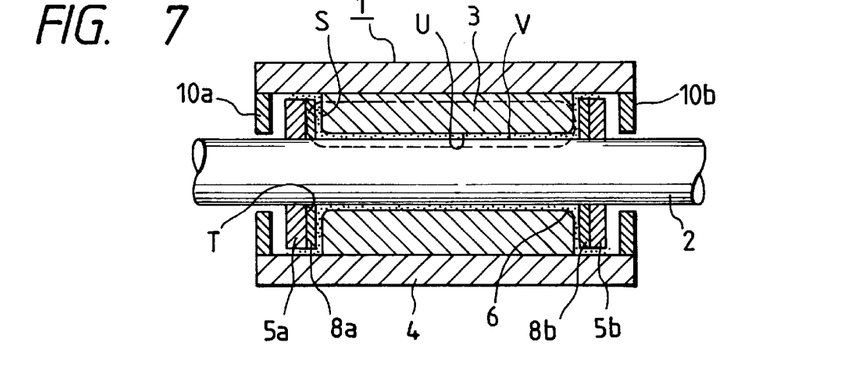
FIG. 7 is a cross-sectional view indicating the structure of the bearing unit relating to the fourth embodiment of the present invention.

FIG. 7 is a cross-sectional view indicating the structure of a bearing unit relating to a fourth embodiment of the present invention.

The present embodiment differs from the previous embodiments 1–3, wherein the oil impregnated porous bearings 3a, 3b are arranged with the permanent magnet 5 being disposed therebetween, in arranging a pair of permanent magnets 5a, 5b so that an oil impregnated porous bearing 3 is disposed therebetween.

That is, the bearing unit 1 relating to the present embodiment comprises an oil impregnated porous bearing 3 which is fixed at an interior circumferential plane of the bearing housing 4, two permanent magnets 5a, 5b fixed to the rotary shaft 2, washers 8a, 8b which are inserted between end faces of the permanent magnets 5a, 5b and the oil impregnated porous bearing 3, and holding plates 10a, 10b which are fixed at end portions of the bearing housing 4 outside the permanent magnets 5a, 5b.

The bearing unit 1 having the above described composition is assembled by the steps of press-inserting the oil impregnated porous bearing 3 into the interior circumference of the bearing housing 4, forming the interior plane of the oil impregnated porous bearing 3 to a designated shape and size using sizing pins, press-inserting and fixing the permanent magnet 5a and the washer 8a onto the rotary shaft 2, inserting the rotary shaft 2 from one side where neither the permanent magnet nor the washer are fixed into the oil impregnated porous bearing 3, determining an adequate relative position of the rotary shaft 2 so as to maintain a designated gap c between the washer 8a and the end face of the bearing 3, press-inserting and fixing the permanent magnet 5b and the washer 8b onto the opposite side of the rotary shaft 2 at an adequate relative position on the rotary shaft 2 so as to maintain a designated gap c between the washer 8b and the end face of the bearing 3, and fixing ring shaped holding plates 10a, 10b to respective opening portions at both ends of the bearing housing 4 to compose a bearing unit 1. In the present embodiment, the oil impregnated porous bearing 3, the permanent magnets 5a, 5b, and the washers 8a, 8b are fixed by press-inserting. However, other, fixing methods well known to the public, such as adhesion and others, can naturally be used.

In accordance with the above composition, a magnetic circuit indicated by the dotted lines in FIG. 7 is formed among the oil impregnated porous bearing 3, the permanent magnets 5a, 5b provided at the both ends of the oil impregnated porous bearing 3, and the permeable rotary shaft 2, and the ferro-fluid 6 is captured at the slide plane of the oil impregnated porous bearing 3 thereby. The washers 8a, 8b are provided in order to fix their position in a thrust direction and to provide for mixing of lubrication. The holding plates 10a, 10b are provided in order to prevent splashing of the ferro-fluid 6.

In the present embodiment, a load in a thrust direction is borne by the end faces T of the permanent magnet 5a, 5b, and the end face S of the oil impregnated porous bearing 3, and a load in a radial direction is borne by the exterior circumferential plane V of the rotary shaft 2 and the interior circumferential plane U of the oil impregnated porous bearing 3. The bearing planes T, S, V, U are wet by the ferro-fluid 6 exuded from the oil impregnated porous bearing 3. The ferro-fluid 6 circulates through the bearing planes and the oil impregnated porous bearing 3 for reasons explained previously to lubricate the surfaces between the rotary shaft 2 and the oil impregnated porous bearing 3. In accordance with the present embodiment, the ferro-fluid 6 can be retained between the permanent magnets 5a, 5b, because the permanent magnets 5a, 5b are provided at both ends of the oil impregnated porous bearing 3 respectively, and so ensured sealing performance can be achieved.

Embodiment 5

Figure 8:
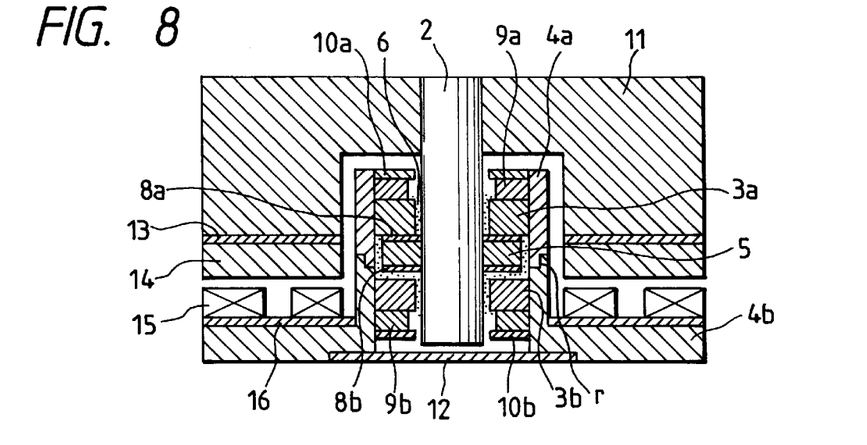
FIG. 8 is a cross-sectional view indicating the structure of the cylindrical motor relating to the fifth embodiment of the present invention.

FIG. 8 is a cross-sectional view indicating the structure of a cylindrical motor relating to the present invention. The cylindrical motor uses the bearing unit relating to the third embodiment shown in FIG. 6. The cylindrical motor is used for driving rotation of cylindrical rotors for acoustic and imaging equipment, such as a video tape recorder and a digital audio tape recorder. A main magnet 14 of the motor is fixed via a rotor yoke 13 to a cylindrical rotor 11 having an information storing portion. Coils 15 of the motor are arranged at an upper surface of a flange portion of the bearing housing 4b via a stator yoke 16, and the cylindrical rotor 11 is supported by the oil impregnated porous bearings 3a, 3b rotatably. That is, in FIG. 8, the holding plate 10b, the permanent magnet 9b, and the oil impregnated porous bearing 3b are fixed at the interior circumference of the lower bearing housing 4b in the above described order from the bottom. And, to the upper bearing housing 4a, the holding plate 10a, the permanent magnet 9a, and the oil impregnated porous bearing 3a are fixed in the above described order from the top. A ring shaped permanent magnet 5 is fixed at the middle portion of the rotary shaft 2. Further, ring shaped washers 8a, 8b are fixed at end faces of the ring shaped permanent magnet 5.

The cylindrical motor having the above described composition is assembled by the steps of inserting the rotary shaft 2 having the permanent magnet 5 into an opening of the oil impregnated porous bearing 3b in the bearing housing 4b, inserting an opening of the oil impregnated porous bearing 3a in the upper bearing housing 4a onto the rotary shaft 2, joining the bearing housings, 4a, 4b at the joining portion r so as to a function as a bearing for the rotary shaft 2, fixing the cylindrical rotor 11, whereon the main magnet 14 is fixed via the rotor yoke 13 at the exterior circumference of the bottom plane, to the upper end portion of the rotary shaft 2, and providing a lid 12 at a bottom opening of the lower bearing housing 4b.

In the motor relating to the present invention, the rotary shaft 2 is supported by the bearing unit 1 relating to the third embodiment of the present invention as previously described, and is fluid-lubricated smoothly with the ferro-fluid 6. Therefore, the motor has an extremely small acoustic noise of from rotation than motors using conventional ball bearings, and the silence of the motor can be improved and noise generated from equipment can be decreased. Further, the motor has the advantage of being able to maintain accuracy of rotation because it does have unstable vibration components, such as a ball passing vibration.

Embodiment 6

Figure 9:
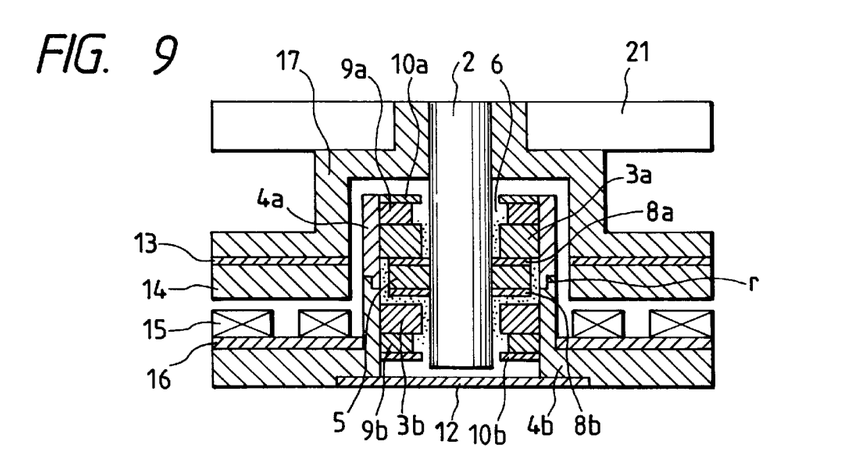
FIG. 9 is a cross-sectional view indicating the structure of the fan motor relating to the sixth embodiment of the present invention.

FIG. 9 is a cross-sectional view indicating the structure of a fan motor relating to the present invention. The fan motor uses the bearing unit relating to the third embodiment shown in FIG. 6. The present embodiment is similar to the fifth embodiment shown in FIG. 8 structurally and differs therefrom by replacing the cylindrical rotor 11 in FIG. 8 with a collar 17 and a fan 21. Therefore, the same reference numerals are used in FIG. 9 to identify members which are identical with members in FIG. 8, and an explanation thereof is omitted.

In accordance with the above composition, the motor relating to the present invention achieves a more preferable reduction in noise than motors supported by conventional ball bearings even in a high speed rotating condition, because the rotary shaft 2 is supported by the oil impregnated porous bearing 3a, 3b with fluid lubrication smoothly; and accordingly, the advantage of being able to maintain a silent room environment is realized. Especially, as the bearing unit relating to the present embodiment can be used even in a high speed rotating condition, the fan 16 can be reduced in size, and accordingly, making the fan motor small and while increasing the rotating speed is possible. When the fan motor is used for cooling equipment, it is effective for down sizing of equipment, such as computers.

In the present embodiment, if a polygon mirror, which is used for writing with a laser beam in imaging equipment or printers, is installed in the collar 17 instead of the fan 21, a polygon mirror motor can be easily obtained.

Embodiment 7

Figure 10:
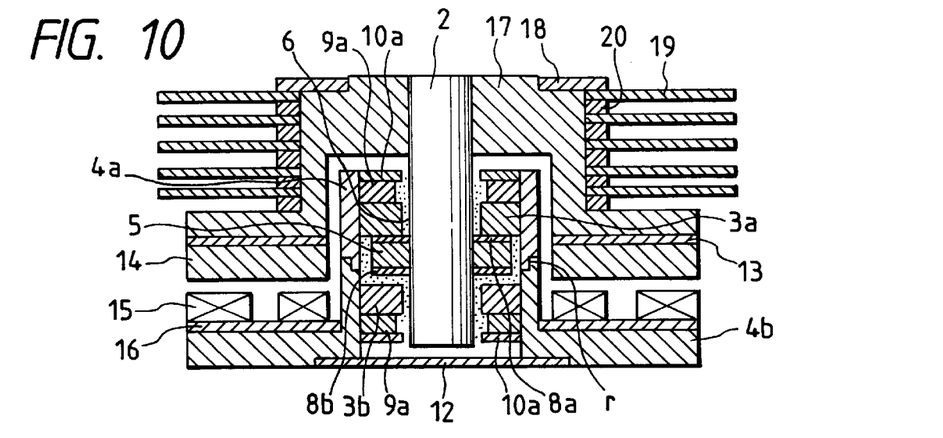
FIG. 10 is a cross-sectional view indicating the structure of the spindle motor for magnetic disk driving equipment relating to the seventh embodiment of the present invention.

FIG. 10 is a cross-sectional view indicating the structure of a spindle motor for magnetic disk driving relating to the present invention. The spindle motor uses the bearing unit relating to the third embodiment shown in FIG. 6. The present embodiment equals to the fifth embodiment shown in FIG. 8 structurally and differs by replacing the cylindrical rotor 11 with a collar 17 and providing magnetic disks 19 which are fixed at a side plane of the collar 17 with spacer rings 20 and a clamp ring 18. Therefore, the same reference numerals are used in FIG. 10 to identify members which identical with the members in FIG. 8, and an explanation thereof is omitted.

In accordance with the above composition, the motor relating to the present embodiment achieves a more preferable noise reduction than motors supported by conventional ball bearings even in a high speed rotating condition, because the rotary shaft 2 is supported by the oil impregnated porous bearing 3a, 3b with fluid lubrication smoothly; and accordingly, the advantages of being able to suppress noise from equipment to a minimum and to maintain a silent room environment are realized. Especially, as the bearing unit relating to the present embodiment can be used even in a high speed rotating condition, the magnetic disks 19 can be supported with accurate and smooth rotation. Further, the bearing unit can be used in a clean environment in addition to maintaining accurate rotation by providing an superior sealing property, because oil contamination is not allowed in use of the magnetic disk.

Embodiment 8

Figure 11:
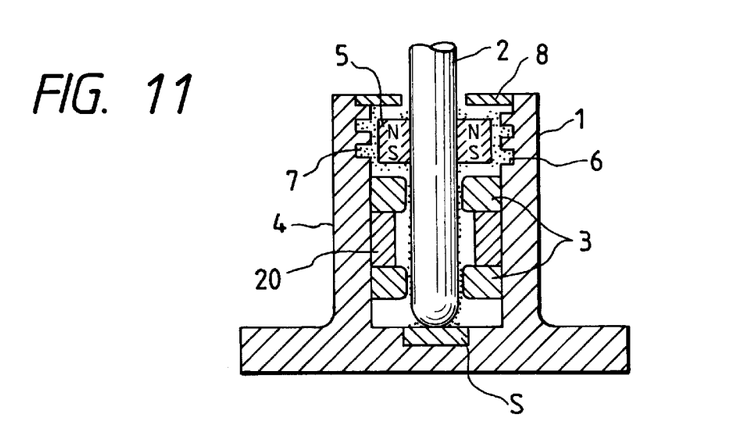
FIG. 11 is a vertical section indicating the structure of the bearing unit relating to the eighth embodiment of the present invention.

FIG. 11 is a vertical section indicating the structure of a bearing unit relating to an eighth embodiment of the present invention, An oil impregnated porous bearing 3 containing a ferro-fluid, a spacer 20, a ring washer 8, and a thrust pad S are fixed in a non-magnetizable housing 4 of which the one end is closed and the another end is open, and a spiral groove 7 is provided in the vicinity of the open end of the housing. The rotary shaft 2 is supported by the oil impregnated porous bearing 3 rotatably, a ring shaped permanent magnet 5 is fixed to the rotary shaft 2 at a position facing the spiral groove 7, and a thrust load is borne by one end of the rotary shaft 2.

Figure 12:
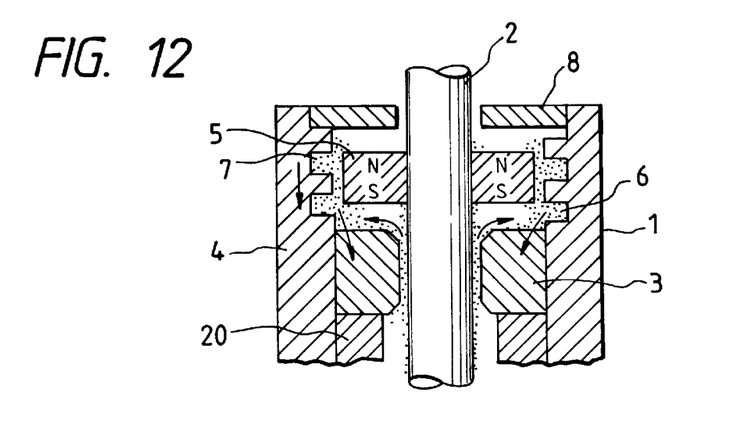
FIG. 12 is a partial sectional view of the bearing unit in FIG. 11.

An adequate amount of ferro-fluid 6 is previously supplied to the permanent magnet 5 in the bearing unit 1 composed of the above described members. The ferro-fluid 6 contained in the oil impregnated porous bearing 3 and supplied to the permanent magnet 5 is magnetized with the rotary shaft 2 by the permanent magnet 5 as shown in FIG. 12, and the ferro-fluid 6 is retained at slide planes of the bearing 3 and the thrust pad S and in the spiral groove 7. Accordingly, in the bearing unit 1 relating to the present embodiment, the ferro-fluid 6 is retained inside the bearing unit by a magnetic attracting force of the permanent magnet 5 in a stationary condition and a low speed rotating condition wherein a dynamic pressure action of the spiral groove is weak, and accordingly, sealing of the ferro-fluid 6 is ensured. In a high speed rotating condition, the ferro-fluid 6 contained in the oil impregnated porous bearing 3 exudes from the bearing 3 by volumetric expansion caused by heat generation of the bearing 3 and is attracted toward the permanent magnet 5 in a direction shown by arrows in FIG. 12. While, as the spiral groove 7 is provided in the housing 4 so as to extrude the ferro-fluid in a direction shown by arrows in FIG. 12 with rotation of the rotary shaft 2, the ferro-fluid 6 in the spiral groove 7 wets the end face of the oil impregnated porous bearing 3, an equivalent amount of the ferro-fluid 6 to the exuded amount from the oil impregnated porous bearing 3 is absorbed into the oil impregnated porous bearing 3 by a capillary phenomenon, the exudation and the absorption are balanced, and consequently, the supply of ferro-fluid 6 to the oil impregnated porous bearing 3 by self circulation is repeated. Therefore, in accordance with the bearing unit 1 relating to the present invention, the slide plane of the oil impregnated porous bearing 3 is always wet by the ferro-fluid 6 so as to operate with fluid lubrication in both a stationary condition and a high speed rotating condition. Consequently, accurate rotation can be achieved in a wide range from low speed rotation to high speed rotation. Further, the slide plane at the thrust pad S operates with fluid lubrication because the rotary shaft 2 is magnetized, and the ferro-fluid 6 is always attracted to the pivot portion at the end of the rotary shaft 2.

The same function and advantage as those of the spiral groove 7 for generating dynamic pressure provided in the housing 4 can be obtained when the spiral groove 7 is not formed in the housing 4, but is formed at the exterior circumferential plane of the permanent magnet 5. Furthermore, in accordance with the bearing unit 1 relating to the present embodiment, overflow of the ferro-fluid 6 from the housing 4 can be prevented because the oil impregnated porous bearing 3 and the permanent magnet 5 are arranged with adequate spacing in consideration of the volumetric expansion of the ferro-fluid 6.

Embodiment 9

Figure 13:
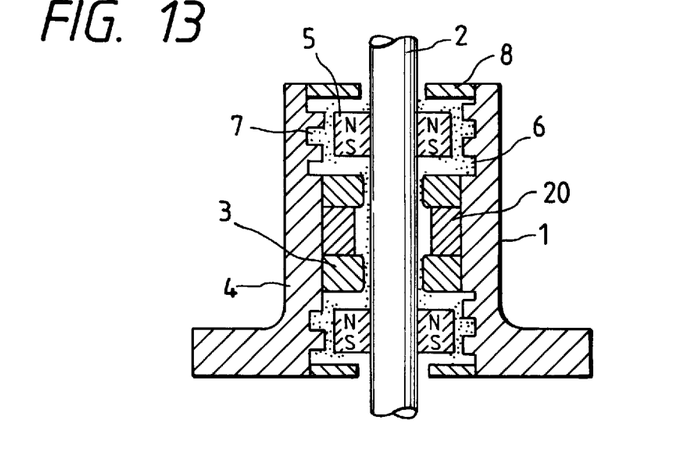
FIG. 13 is a vertical section indicating the structure of the bearing unit relating to the ninth embodiment of the present invention.

FIG. 13 is a vertical section indicating the structure of an axis-through type bearing unit having a non-magnetizable housing 4 with open ends relating to the present invention. The arrangement of the oil impregnated porous bearing 3 and other members is the same as the bearing unit shown in FIG. 10, except that spiral grooves 7 having the same function and advantage as the embodiment of FIG. 11 are provided at both end portions of the housing 4, respectively, in the bearing unit 1 of the present embodiment. In accordance with the present composition, leakage of the ferro-fluid 6 from both the upper and the lower sealing portions can be prevented by the previously described function and advantage. Therefore, the present composition can be usable in cases when the thrust pad S is provided outside the housing 4, or when a load such as cylinders of a video tape recorder or magnetic disks and similar elements, are fixed at one end of the rotary shaft 2, and members for driving, such as a motor rotor or a pulley are fixed at the other end of the rotary shaft 2.

Embodiment 10

Figure 14:
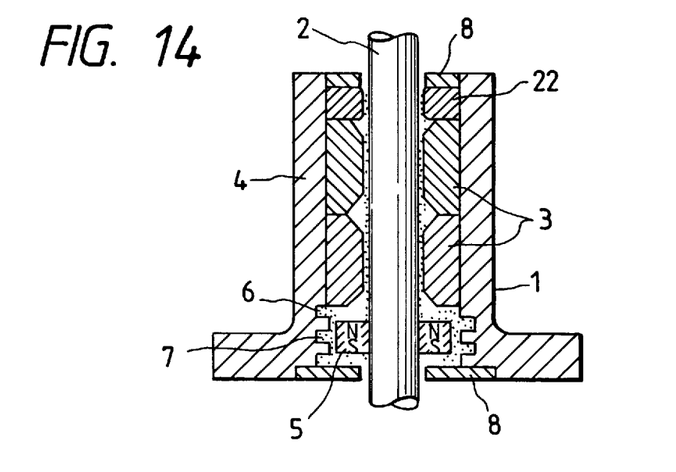
FIG. 14 is a vertical section indicating the structure of the bearing unit relating to the tenth embodiment of the present invention.

FIG. 14 is a vertical section indicating the structure of a bearing unit relating to the present invention. In the present composition, a porous felt metal member 22 having a larger pore size than that of the oil impregnated porous bearing 3 is fixed at one end of the housing 4 adjacent to the oil impregnated porous bearing 3, a ring shaped permanent magnet 5 is fixed onto the rotary shaft 2 at a location facing the other end of the housing 4, with a gap being provided with the oil impregnated porous bearing 3, and a spiral groove 7 is provided inside the housing 4 at a location facing the exterior circumference of the permanent magnet 5.

Figure 15:
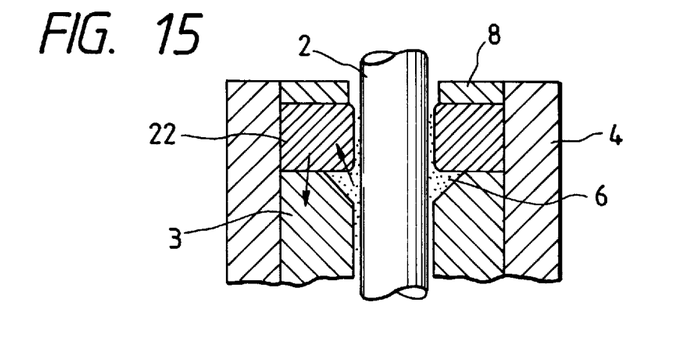
FIG. 15 is a partial sectional view of the bearing unit in FIG. 14.

In accordance with the present composition, the ferro-fluid 6 contained in the oil impregnated porous bearing 3 exudes outside due to temperature elevation of the bearing 3 as the speed of rotation increases. The exuded ferro-fluid 6 is absorbed by the porous felt metal member 22 having a large pore size due to the capillary phenomenon as shown by arrows in FIG. 15 indicating a partially sectional view of the bearing unit in FIG. 14. The ferro-fluid 6 absorbed by the porous felt metal member 22 is transferred and absorbed into the oil impregnated porous bearing 3 as shown by the arrows in FIG. 15 because pores in the oil impregnated porous bearing 3 have a smaller diameter than pores in the porous felt metal member 22 and the felt metal member 22 contacts tightly to the oil impregnated porous bearing 3 tightly.

The above transfer of the ferro-fluid utilizes a phenomenon that, when two porous materials having mutually different pore sizes and are impregnated with fluid are in tight contact, the fluid transfers from the material having a larger pore size to the material having a smaller pore size due to a capillary phenomenon, but does not flow from the material having a smaller pore size to the material having a larger pore size. Therefore, a self circulating oil supply to the bearing can be provided by causing the material having a larger pore size to tightly contact the material having a smaller pore size, as in the present embodiment, and an advantage of preventing oil leakage from the bearing unit is realized. Evaporation of the ferro-fluid 6 can be reduced remarkably by providing washers 8 in all of the embodiments. Especially in the embodiment shown in FIG. 14, since an end face of the felt metal member 22 is an evaporating area, providing the washers 8 extends the life of the bearing and the reliability thereof.

The above described functions and advantages have been confirmed, by experiments using a rotary shaft 2 of 3 mm diameter, that the bearing unit relating to the present invention can be used in a high speed rotating condition up to 10,000 rotations per minute with an ensured sealing property and preferable accuracy. Further, as the bearing unit relating to the present invention has a simple structure, the bearing unit is suitable for mass production. Therefore, the present invention can provide bearing units which are superior in mass productivity and are inexpensive.

The bearing unit having the composition explained above relating to the present invention has various advantages that will be explained hereinafter.

In accordance with the present invention, bearing units having a low friction and long life can be provided by making the bearing unit have both a radial bearing function and a thrust bearing function integrally and ensuring cooling of the ferro-fluid, because the ferro-fluid exudes into gaps between the permanent magnet fixed to the rotary shaft and the end face of the porous bearing facing the permanent magnet and between the exterior circumferential plane of the rotary shaft and the interior circumferential plane of the porous bearing. The ferro-fluid circulates between the slide plane and the oil impregnated porous bearing with rotation of the rotary shaft, and smooth fluid lubrication becomes available In accordance with the present invention, wherein oil impregnated porous bearings are arranged so as to have a permanent magnet disposed therebetween, the bearing unit can be disposed in any arbitrary orientations because the thrust bearing is provided between the end face of the permanent magnet and the end face of the oil impregnated porous bearing, and the bearing can be used in a clean environment because the ferro-fluid can be captured certainly along the magnetic circuit formed by the permanent magnet.

In accordance with the present invention wherein permanent magnets are arranged so as have the oil impregnated porous bearing disposed therebetween, the bearing unit can be arranged in any arbitrary orientation because the thrust bearing is provided between the end face of the permanent magnet and the end face of the oil impregnated porous bearing, and the bearing can be used in a clean environment because the ferro-fluid can be captured certainly along the magnetic circuit formed by the permanent magnet.

In accordance with the present invention, wherein the rotary shaft is made of a permeable material and the oil impregnated porous bearing is made of a non-magnetizable material, anti-radial load performance can be improved because a magnetic circuit is formed along the rotary shaft and more of the ferro-fluid is captured around the rotary shaft than occurs in other arrangements.

In accordance with the present invention, wherein the rotary shaft is made of a non-magnetizable material and the oil impregnated porous bearing is made of a permeable material, anti-thrust load performance can be improved because a magnetic circuit is formed along the oil impregnated porous bearing and more of the ferro-fluid is captured more at around the bearing than in other arrangements.

In accordance with the present invention, wherein a convex portion and a concave portion are formed at any one of the facing planes of the oil impregnated porous bearing and the permanent magnet, anti-load performance can be improved because dynamic pressure generation increases due to a wedge effect of the oil film.

In accordance with the present invention, wherein a ring shaped thin plate having a low friction coefficient and superior wear resistance is provided at the end face of the permanent magnet and in a gap between the above end face and the end face of the facing oil impregnated porous bearing, the friction coefficient at the thrust bearing portion can be decreased further and the wear resistance at the thrust bearing portion can be improved.

In accordance with the present invention, wherein the above mentioned ring shaped thin plate is made of any material selected from a group consisting of resin, metal and rubber, the same advantages as mentioned above can be obtained.

In accordance with the present invention, wherein the permanent magnets for retaining the ferro-fluid are provided at both end portions of the housing for the oil impregnated porous bearing, the ferro-fluid is certainly captured between the permanent magnets because a magnetic circuit is formed among the permanent magnet, the permanent magnet provided at the rotary shaft, and the rotary shaft or the oil impregnated porous bearing, and use of the bearing unit in a clean environment becomes possible because the ferro-fluid does not splash outside the bearing housing even if the rotary shaft rotates fast.

In accordance with the present invention, wherein the holding plates for retaining the ferro-fluid are provided at both end portions of the housing, the bearing unit can be used in a clean environment because the ferro-fluid captured by the bearing unit does not splash outside the bearing housing even if the rotary shaft rotates fast.

In accordance with the present invention, wherein the housing is comprised of two members, one being a portion provided with one oil impregnated porous bearing and the other being a portion provided with another oil impregnated porous bearing, and the two members have joining portions mutually at the facing end faces, an improvement in mass productivity and a decrease in cost can be achieved because the bearing unit can be assembled easily by butt joining the joining portion of the one housing to the joining portion of the other housing after assembling all of the internal members inside the housing.

In accordance with the present invention, wherein the bearing unit comprises a ring shaped permanent magnet fixed to the rotary shaft, an oil impregnated porous bearing containing ferro-fluid fixed at a location adjacent to the above permanent magnet inside the housing of the bearing, a coil provided outside of the housing via the stator yoke, a rotating member fixed to the above rotary shaft, and main magnet fixed to the rotating member at a location facing the above coil via the rotor yoke, with the rotary shaft being supported with the bearing housing rotatably, a motor having low friction, long life, fast and accurate rotation, and superior quietness can be provided because smooth fluid lubrication and ensured cooling of the ferro-fluid are realized. Further, as the radial bearing and the thrust bearing are integrated into a simple structure, a motor having decreased size and superior flexible availability, with no restriction in the directions of orientation the rotary shaft, can be provided.

In accordance with the present invention, wherein the rotating member comprises a cylindrical rotor provided with a cylindrical head, a cylindrical motor having superior read/write characteristics in addition to the above described advantages can be provided. In accordance with the present invention, wherein the rotating member comprises a fan for blowing used in air-conditioners, a fan which can be decreased in size in addition to the above described advantages can be provided.

In accordance with the present invention, wherein the rotating member comprises a holding member for holding a disk shaped magnetic recording medium, a spindle motor for magnetic disk driving having superior read/write characteristics in addition to the above described advantages can be provided.

In accordance with the present invention, wherein the rotating member comprises a holding member for holding a polygon mirror for laser beam scanning, a polygon mirror motor having superior light writing characteristics in addition to the above described advantages can be provided.

In accordance with the present invention, wherein the bearing unit is composed of the steps of press-inserting and fixing the oil impregnated porous bearings containing ferro-fluid into inside of a pair of housings having interior circumferential planes which are finished to a designated size, inserting the rotary shaft whereon the permanent magnet is fixed into the interior circumference of the oil impregnated porous bearing in one of the housings, inserting the interior circumference of the oil impregnated porous bearing in the other housing onto the exterior circumference of the rotary shaft, and subsequently, the mutually facing joining portions of the both housings are butt joined for forming an integrated body, a bearing housing having a superior assembling property, improved mass productivity, and decreased cost can be provided because the bearing housing is dividable.

In accordance with the present invention, wherein the size and shape of a slide plane in a radial direction of the oil impregnated porous bearing is formed by press-inserting sizing pins, the above described advantages of the invention can be achieved because the slide plane can be formed easily by simply establishing size and shape of the bearing.

In accordance with the present invention shown in the embodiments 8–10, for example, the ferro-fluid as a lubricant can be supplied and circulated to the rotary shaft with rotation of the rotary shaft by the functions of the permanent magnet fixed to the rotary shaft and the spiral groove for generating dynamic pressure, and consequently, smooth and accurate rotation can be obtained by the fluid lubricating effect. Further, according to the present composition, ensured sealing in a wide range from a stationary condition to high speed rotation can be obtained by the magnetic attracting effect of the permanent magnet and the dynamic pressure effect of the spiral groove. Furthermore, the same advantage as mentioned above can be obtained by positioning a felt metal member having a different pore size from that of the bearing in tight contact with the bearing. Since the bearing unit relating to the present invention can retain fluid lubrication in a wide range from low speed rotation to high speed rotation without oil leakage, an improvement in performance and the functions of the equipment can be obtained when the bearing is applied to equipment, such as a cylindrical motor in a video tape recorder. Since the bearing unit relating to the present invention has a simple structure, the above described advantages, and superior mass productivity, in an inexpensive bearing unit for a small size motor, can be provided.

What is claimed is:

1. An oil impregnated porous bearing unit for rotatably supporting a rotary shaft, with a ferro-fluid disposed between the rotary shaft and a bearing of the bearing unit, said bearing unit comprising:
   a rotary shaft;
   at least one ring shaped permanent magnet fixed to said rotary shaft for rotation therewith;
   a housing encircling said permanent magnet and at least a portion of said rotary shaft;
   at least one porous bearing fixed inside said housing at a location axially adjacent to and facing said permanent magnet to define an axial gap between an end face of said permanent magnet and an end face of said porous bearing and an annular gap between an exterior circumferential surface of said rotary shaft and an interior circumferential surface of said porous bearing;
   a ferro-fluid within said axial gap and said annular gap, said ferro-fluid impregnating said porous bearing and surrounding said permanent magnet;
   one of said rotary shaft and said porous bearing being permeable, and the other of said rotary shaft and said porous bearing being non-magnetizable; and
   whereby, upon rotation of the rotary shaft the ferro-fluid is urged by centrifugal force to exude through the axial gap and the annular gap so as to circulate between said end face of said permanent magnet and said end face of said porous bearing and between said exterior circumferential surface of said rotary shaft and said interior circumferential surface of said porous bearing.

2. An oil impregnated porous bearing unit as claimed in claim 1, wherein two porous bearings are arranged with a permanent magnet disposed therebetween.

3. An oil impregnated porous bearing unit as claimed in claim 1, wherein two permanent magnets are arranged with an porous bearing disposed therebetween.

4. An oil impregnated porous bearing unit as claimed in claim 1, wherein said rotary shaft is made of a permeable material and said porous bearing is made of non-magnetizable material.

5. An oil impregnated porous bearing unit as claimed in claim 1, wherein said rotary shaft is made of a non-magnetizable material and said porous bearing is made of a permeable material.

6. An oil impregnated porous bearing unit as claimed in claim 1, wherein a surface of said porous bearing facing said permanent magnet is formed with a convex portion and a concave portion.

7. An oil impregnated porous bearing unit as claimed in one of claims 1 and 2, further comprising permanent magnets at end portions of said housing for capturing said ferro-fluid.

8. An oil impregnated porous bearing unit as claimed in claim 7, further comprising holding plates at end portions of said housing for retaining said ferro-fluid.

9. An oil impregnated porous bearing unit as claimed in claim 1, wherein said housing comprises two members, each of which is provided with a porous bearing and said ferro-fluid, and each of which includes a joining portion at mutually facing end faces thereof, said joining portions being joined to form said housing.

10. An oil impregnated porous bearing unit as claimed in claim 1, further comprising holding plates at end portions of said housing for retaining the ferro-fluid.

11. A motor comprising:
    a rotary shaft;
    a ring shaped permanent magnet fixed to said rotary shaft for rotation therewith;
    a bearing housing encircling said permanent magnet and at least a portion of said rotary shaft;
    at least one porous bearing fixed inside said bearing housing at a location axially adjacent to said permanent magnet;
    a stator yoke outside said bearing housing;
    a coil on said stator yoke;
    a rotary member fixed to said rotary shaft;
    a rotor yoke;
    a main magnet fixed to said rotary member via said rotor yoke at a location facing said coil and;
    a ferro-fluid within said housing and impregnating said porous bearing,
    wherein said rotary shaft is rotatably supported by said at least one oil impregnated porous bearing and said ring shaped permanent magnet in said bearing housing.

12. A motor as claimed in claim 11, wherein said rotary member is a cylindrical rotor having a cylindrical head.

13. A motor as claimed in claim 11, wherein said rotary member is a fan for blowing air.

14. A motor as claimed in claim 11, wherein said rotary member is a holding member for holding a disk shaped magnetic recording medium.

15. A motor as claimed in claim 11, wherein said rotary member is a holding member for holding a polygon mirror for laser beam scanning.

16. An oil impregnated porous bearing unit comprising:
    a rotary shaft;
    a non-magnetizable housing having a closed end and an open end and encircling at least a portion of said rotary shaft;
    a ring shaped permanent magnet fixed to said rotary shaft adjacent the open end of said housing;
    at least one porous bearing fixed to an inner surface of said housing at a position axially between said ring shaped permanent magnet and said closed end of said housing; and
    a ferro-fluid disposed between said rotary shaft and said porous bearing and impregnating said porous bearing,
    wherein a spiral groove is provided adjacent the open end of said housing in one of the inner circumferential surface of said housing facing an exterior circumferential surface of said housing facing an exterior circumferential surface of said permanent magnet, and the exterior circumferential surface of said permanent magnet, for retaining the ferro-fluid within said housing during rotation of said rotary shaft.

17. An oil impregnated porous bearing unit comprising:
    a rotary shaft;
    a non-magnetizable housing having open ends and encircling at least a portion of said rotary shaft;
    a pair of ring shaped permanent magnets fixed to said rotary shaft and arranged adjacent the respective open ends of said housing;
    a porous bearing fixed to an inner surface of said housing at a position axially between said pair of ring shaped permanent magnets; and
    a ferro-fluid disposed between said rotary shaft and said porous bearing and impregnating said porous bearing,
    wherein a spiral groove is provided adjacent the open ends of said housing in one of the inner circumferential surface of said housing facing exterior circumferential surfaces of said permanent magnets, and the exterior circumferential surfaces of said permanent magnets, for retaining the ferro-fluid within said housing during rotation of said rotary shaft.

18. An oil impregnated porous bearing unit for rotatably supporting a rotary shaft and having ferro-fluid disposed between the rotary shaft and at least one oil impregnated porous bearing containing the ferro-fluid and fixed to an inner surface of a non-magnetizable housing having open ends, wherein:

a ring shaped plate made of porous material having a larger pore size than the pore size of the oil impregnated porous bearing is provided in said housing in tight contact with said oil impregnated porous bearing and adjacent a first open end of the housing;

a permanent magnet fixed to said rotary shaft is arranged adjacent to a second open end of said housing at a location axially adjacent to said oil impregnated porous bearing and axially spaced therefrom by a gap; and a spiral groove is provided adjacent the open ends of said housing in one of the inner surface of said housing facing an exterior circumferential surface of said permanent magnet, and the exterior circumferential surface of said permanent magnet, for retaining the ferro-fluid within said housing during rotation of said rotary shaft.

19. An oil impregnated porous bearing unit according to claim 18, wherein a pair of oil impregnated bearings containing ferro-fluid are arranged in said housing at positions axially between said ring shaped plate and said permanent magnet.

20. An oil impregnated porous bearing unit according to claim 16, wherein a pair of porous bearings are arranged in said housing in axially spaced relationship.

21. An oil impregnated porous bearing unit for rotatably supporting a rotary shaft, with a ferro-fluid disposed between the rotary shaft and a bearing of the bearing unit, said bearing unit comprising:

a non-magnetizable housing having an open end and a closed end;

a rotary shaft within said housing;

a ring-shaped permanent magnet fixed to said rotary shaft adjacent the open end of said housing;

a porous bearing fixed to an inner surface of said housing at a position axially between said magnet and the closed end of said housing; and a ferro-fluid within said housing and impregnating said porous bearing, wherein one of the inner circumferential surface of said housing facing an exterior circumferential surface of said permanent magnet, and the exterior circumferential surface of said permanent magnet has a spiral groove therein adjacent the open end of the housing for generating dynamic pressure to retain the ferro-fluid within said housing during rotation of said rotary shaft.

22. An oil impregnated porous bearing unit for rotatably supporting a rotary shaft, with a ferro-fluid disposed between the rotary shaft and a bearing of the bearing unit, said bearing unit comprising:

a non-magnetizable housing having open ends;

a permeable rotary shaft within said housing;

a pair of ring-shaped permanent magnets fixed to said rotary shaft adjacent the respective open ends of said housing;

a porous bearing fixed to an inner surface of said housing at a position axially between said pair of magnets; and a ferro-fluid within said housing and impregnating said porous bearing, wherein one of the inner circumferential surface of said housing facing exterior circumferential surfaces of said permanent magnets, and the exterior circumferential surfaces of said permanent magnets has a spiral groove therein adjacent the open ends of said housing for generating dynamic pressure to retain the ferro-fluid within said housing during rotation of said rotary shaft.

23. An oil impregnated porous bearing unit for rotatably supporting a rotary shaft, with a ferro-fluid disposed between the rotary shaft and a bearing of the bearing unit, said bearing unit comprising:

a non-magnetizable housing having open ends;

a rotary shaft within said housing;

an oil impregnated porous bearing containing ferro-fluid and fixed to an inner surface of said housing;

a ring-shaped plate, made of a porous material having a pore size larger than the pore size of said porous bearing, said plate affixed in said housing in tight contact with said porous bearing and adjacent a first open end of said housing; and a permanent magnet fixed to said rotary shaft at a position adjacent to a second open end of said housing, and axially adjacent to said porous bearing and axially spaced therefrom by a gap, wherein one of the inner surface of said housing facing an exterior circumferential surface of said permanent magnet, and the exterior circumferential surface of said permanent magnet has a spiral groove therein adjacent the open ends of said housing for generating dynamic pressure to retain the ferro-fluid within said housing during rotation of said rotary shaft.

24. An oil impregnated porous bearing unit comprising:

a rotary shaft:

a non-magnetizable housing having first and second open ends and encircling at least a part of said rotary shaft;

at least one porous bearing fixed to an inner surface of said housing;

a ferro-fluid disposed between said rotary shaft and said porous bearing and impregnating said porous bearing, a ring-shaped plate made of porous material having a pore size larger than the pore size of said oil impregnated porous bearing, said ring-shaped plate positioned in said housing in tight contact with said porous bearing and adjacent the first open end of the housing; and a permanent magnet fixed to said rotary shaft adjacent to the second open end of said housing at a location axially adjacent to said porous bearing and axially spaced therefrom by a gap;

wherein a spiral groove is provided adjacent the open ends of said housing in one of the inner circumferential surface of said housing facing an exterior circumferential surface of said permanent magnet, and the exterior circumferential surface of said permanent magnet, for retaining the ferro-fluid within said housing during rotation of said rotary shaft.

25. An oil impregnated porous bearing unit according to claim 24, wherein a pair of porous bearings are arranged in said housing at positions axially between said ring shaped plate and said permanent magnet.

26. An oil impregnated porous bearing unit for rotatably supporting a rotary shaft, with a ferro-fluid disposed between the rotary shaft and a bearing of the bearing unit, said bearing unit comprising:

a non-magnetizable housing having open ends;

a rotary shaft within said housing;

a porous bearing fixed to an inner surface of said housing;

a ring-shaped plate, made of a porous material having a pore size larger than the pore size of said porous bearing, said plate affixed in said housing in tight contact with said porous bearing and adjacent a first open end of said housing; and     a permanent magnet fixed to said rotary shaft at a position adjacent to a second open end of said housing, and axially adjacent to said porous bearing and axially spaced therefrom by a gap, wherein one of the inner circumferential surface of said housing facing an exterior circumferential surface of said permanent magnet, and the exterior circumferential surface of said permanent magnet has a spiral groove therein adjacent the open ends of said housing for generating dynamic pressure to retain the ferro-fluid within said housing during rotation of said rotary shaft.

\* \* \* \* \*